US006504943B1

(12) United States Patent
Sweatt et al.

(10) Patent No.: US 6,504,943 B1
(45) Date of Patent: Jan. 7, 2003

(54) INFORMATION-EFFICIENT SPECTRAL IMAGING SENSOR

(75) Inventors: William C. Sweatt, Albuquerque, NM (US); Stephen M. Gentry, Albuquerque, NM (US); Clinton A. Boye, Albuquerque, NM (US); Carter L. Grotbeck, Albuquerque, NM (US); Brian R. Stallard, Albuquerque, NM (US); Michael R. Descour, Tucson, AZ (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/345,604

(22) Filed: Jun. 29, 1999

Related U.S. Application Data

(60) Provisional application No. 60/093,732, filed on Jul. 20, 1998.

(51) Int. Cl.$^7$ ................................................. G06K 9/00
(52) U.S. Cl. ........................ 382/103; 356/310; 348/169
(58) Field of Search ................................. 382/103, 100; 356/310; 348/269, 169

(56) References Cited

U.S. PATENT DOCUMENTS

| | | | | |
|---|---|---|---|---|
| 4,790,654 A | * | 12/1988 | Clarke | 356/310 |
| 5,329,595 A | * | 7/1994 | Davis | 382/103 |
| 5,379,065 A | * | 1/1995 | Cutts | 348/269 |
| 5,410,371 A | | 4/1995 | Lambert | 348/769 |
| 5,424,543 A | | 6/1995 | Dombrowski et al. | 250/330 |
| 5,504,575 A | | 4/1996 | Stafford | 356/330 |
| 5,940,523 A | * | 8/1999 | Cornman et al. | 382/100 |
| 6,282,301 B1 | * | 8/2001 | Haskett | 382/103 |

OTHER PUBLICATIONS

W. M. Porter, H. T. Enmark, "A System of the Airborne Visible/Infrared Imaging Spectrometer (AVRIS)," SPIE, vol. 834, Imaging spectroscopy II, 1987.

W. M. Porter, T. G. Chrien, E. G. Hansen, Ch. M. Sature, "Evolution of the Airborne Visible/Infrared Imaging Spectrometer (AVIRIS) Flight and Ground Data Processing System," SPIE, vol. 1298, 1990, pp. 11–17.

L. J. Richard, R. W. Basedow, E. Zalweski, P. Silverglate, M. Landers, "Hydice: An Airborne System for Hyperspectral Imaging," SPIE vol. 1937, Imaging Spectrometry of the Terrestrial Environment, 1993, p. 173.

R. W. Basedow, W. S. Aldrich, K. A. McVey, "Hydice System Performance: An Update," SPIE, vol. 2821, Hyperspectral Remote Sensing and Applications, 1996, Paper #2821–09.

* cited by examiner

*Primary Examiner*—Leo Boudreau
*Assistant Examiner*—Barry Choobin
(74) *Attorney, Agent, or Firm*—Gregory A. Cone; George H Libman

(57) ABSTRACT

A programmable optical filter for use in multispectral and hyperspectral imaging. The filter splits the light collected by an optical telescope into two channels for each of the pixels in a row in a scanned image, one channel to handle the positive elements of a spectral basis filter and one for the negative elements of the spectral basis filter. Each channel for each pixel disperses its light into n spectral bins, with the light in each bin being attenuated in accordance with the value of the associated positive or negative element of the spectral basis vector. The spectral basis vector is constructed so that its positive elements emphasize the presence of a target and its negative elements emphasize the presence of the constituents of the background of the imaged scene. The attenuated light in the channels is re-imaged onto separate detectors for each pixel and then the signals from the detectors are combined to give an indication of the presence or not of the target in each pixel of the scanned scene. This system provides for a very efficient optical determination of the presence of the target, as opposed to the very data intensive data manipulations that are required in conventional hyperspectral imaging systems.

18 Claims, 6 Drawing Sheets

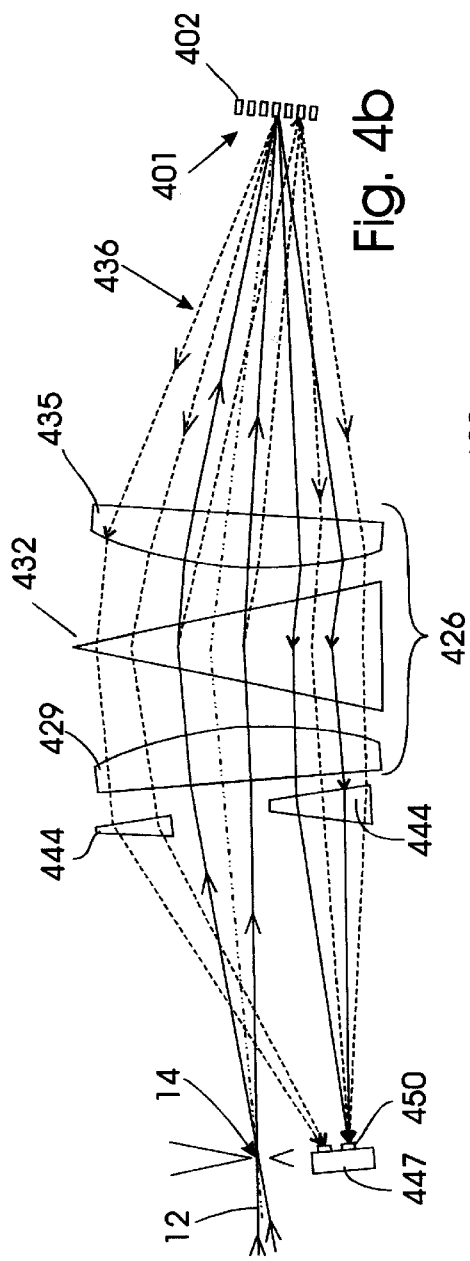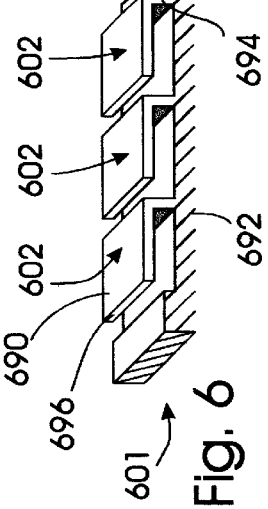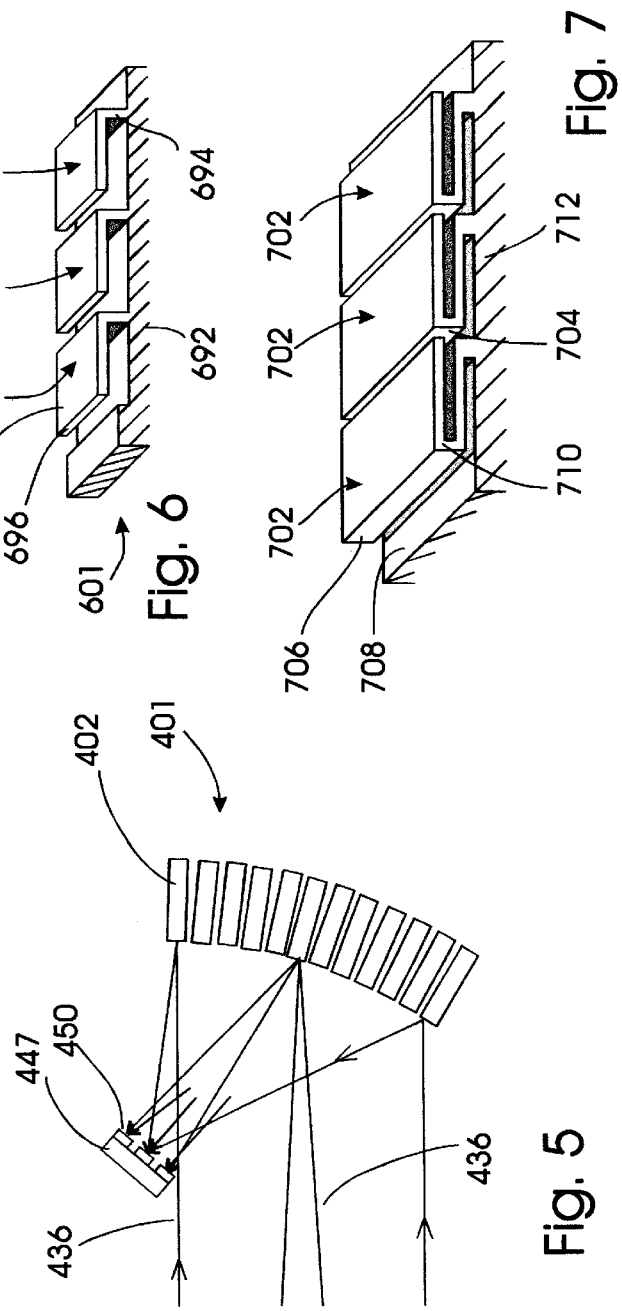

INFORMATION-EFFICIENT SPECTRAL IMAGING SENSOR

CROSS-REFERENCE TO RELATED APPLICATIONS

This application claims the benefit of U.S. Provisional Application No. 60/093,732 filed on Jul. 20, 1998.

STATEMENT REGARDING FEDERALLY SPONSORED RESEARCH

This invention was made with Government support under Contract DE-AC04-94AL85000 awarded by the U.S. Department of Energy. The Government has certain rights in this invention.

BACKGROUND OF THE INVENTION

This invention relates to programmable multispectral filters that are useful for spectroscopic measurements and techniques for manipulating the data collected therefrom to identify scanned objects.

Spectroscopy is the discipline that analyzes the various spectral components of light emanating from a scene to determine what is in the scene or how it is acting in its environment. The light coming from the scene can be created in many different ways, but the immediate applications of the present invention will be concerned mostly with light from the sun or other light source that reflects off the materials in the scene that is then collected and processed by the sensor of this invention, although thermal imaging of infrared energy emanating from the scene is also of interest. By emphasizing the data containing the spectral content unique to a particular target or aspect of the scene, one can highlight that target or aspect and remove much of the clutter arising from the background environment. Much of the work in multispectral imaging has been done in the context of remote sensing by satellite-born sensors, although use of these processes is not limited thereto. The analyzed content of the remotely sensed images is useful in areas including agriculture, meteorology, oceanography, geological exploration, and various national security missions. Spectral imaging sensors have been shown to provide information far superior to that of conventional panchromatic images in many of these applications. These imagers are not limited to satellite applications and, as such, have terrestrial uses in the medical and manufacturing fields as well.

As the technology to build the photodetector arrays that measure the strength of the light in a particular spectral bin has improved, the number of channels (spectral bins) that can be sensed for a particular sample point (or pixel) has increased dramatically over the last few years. However, the light coming from the target/background is fixed, and as one increases the number of spectral channels per pixel, the signal to noise ratio in any one channel will decrease. Also, the data rates of spectral imaging sensors (10 Mbytes/sec, or more) stress the limits of the electronics systems, including the onboard data storage, the downlink bandwidth, and the earthbound image analysis system. The newest conventional multispectral sensors are called hyperspectral imagers (HSI). These sensors can record hundreds of spectral channels for each of the pixels in its array, with a typical array containing hundreds or thousands of pixels. A pixel herein is typically the patch on the ground that defines the minimum resolution of the system in which to look for a target. An HSI system offers the maximum of flexibility for post-collection analysis of the multispectral data but at an immense price in terms of data that needs to be transmitted, stored and processed.

The following references teach various approaches for collecting and processing multispectral data. U.S. Pat. No. 4,790,654 to Clarke discloses a programmable multispectral filter having means to receive a multispectral image, means to disperse the image into multiple spectral components, means to modulate the strength of the light in each spectral component, and means to reflect the modulated component back to the dispersing element for recombination of the multiple spectral components into a filtered whole image. The system can split the dispersed light into two separate channels by polarization for separate modulation in each channel. However, its optics are quite primitive. The spectral modulation is done at the pupil plane, which restricts its use to very small images with very few pixels. Although two channels can be processed at once, there is no mention of using spectral basis vectors that are developed by differencing two orthogonal channels as the means for modulating the light in the spectral bands in each channel. No reason is given for having a two channel capability, presumably one uses one channel to look for one thing and the other channel to look for another thing.

U.S. Pat. No. 5,379,065 to Cutts discloses selecting wavelengths of light that are transmitted using a spectrally agile filter (SAF). A specific embodiment of an SAF is an acousto-optic (AO) cell, where the dynamic grating in the AO cell is tuned to diffract only the wavelengths of interest. The detector is a charge coupled device (CCD) array operating in the shift-and-add mode, also known as the Time Delay and Integrate (TDI) mode. This is a two-dimensional detector that reads out only one line of pixels at a time.

U.S. Pat. No. 5,410,371 to Lambert discloses an AO tunable filter system for selecting wavelengths, one at a time. This system performs hyperspectral imaging, but not all of the wavelengths are simultaneously read; therefore, relatively longer data collection times are required than for the Cutts system.

U.S. Pat. No. 5,424,543 to Dombrowski et a/ discloses a method of taking hyperspectral data of a fixed scene, i.e., one for which high speed imaging is not required. A two-dimensional image is viewed serially using a series of narrow band filters such that many frames of the same image are viewed through different spectral filters.

U.S. Pat. No. 5,504,575 to Stafford discloses a spatial light modulator spectrometer. The spectrometer has collimating means, dispersing means to separate the light assigned to a particular pixel into its various spectral components, a multiplicity of spatial light modulators acting upon the dispersed light from each pixel, and recombination means to refocus the individual, now-modulated spectral components of light back into the individual pixels from whence they came. The spatial light modulators here are digital micromirrors, labeled therein as deformable mirror devices. This is a single channel spectrographic system only, not an imager.

The last references disclose two airborne systems that can collect 128–256 spectral components for each pixel scanned. These are (1) "AVIRIS" (Airborne Visible-InfraRed Imaging Spectrometer—see W. M. Porter, H. T. Enmark, "A System of the Airborne Visible/Infrared Imaging Spectrometer (AVIRIS)", SPIE, Vol. 834, *Imaging Spectroscopy II,* 1987 and W. M. Porter, T. G. Chrien, E. G. Hansen, Ch. M. Sature, "Evolution of the Airborne Visible/infrared Imaging Spectrometer (AVIRIS) Flight and Ground Data Processing System", *SPIE,* Vol. 1298, 1990, pp. 11–17); and (2) "HYDICE" (Hyperspectral Data Image Collection Experiment)—see L. J. Rickard, R. W. Basedow, E.

Zalweski, P. Silverglate, and M. Landers, "HYDICE: An Airborne System for Hyperspectral Imaging," SPIE, Vol. 1937, *Imaging Spectrometry of the Terrestrial Environment*, 1993, p. 173 and R. W. Basedow, W. S. Aldrich, K. A. McVey, "HYDICE System Performance: An Update," SPIE, Vol. 2821, *Hyperspectral Remote Sensing and Applications*, 1996, Paper # 2821-09. Both AVIRIS and HYDICE require significant digital post-processing of the conventional spectral data to identify the materials scanned.

Although these above references demonstrate the progress that has been made in multispectral and hyperspectral imaging, there remains a need in the art from an even more advanced and efficient means of collecting and processing multispectral data for target identification.

BRIEF SUMMARY OF THE INVENTION

This invention presents a new system and method for optically processing hyperspectral data on a pixel-by-pixel basis and providing for utilization of all n spectral bins for each pixel, as necessary, to emphasize a particular aspect or aspects of a scanned scene or to provide an indication or not of whether a target is present in an imaged scene. Although the mathematics behind this technique have been known for some time and have been used for post-collection electronic processing of hyperspectral data, they are applied in a new way herein to diminish, if not eliminate, the need to collect, store, and transmit for electronic processing the entire hyperspectral data set for an image scene.

The present system has two basic embodiments, depending on the order of the components in the beam line. In a first basic embodiment, the light from each pixel in a row of pixels from the imaged scene is first split into at least two separate beams that are then each dispersed into n spectral bins. In a second basic embodiment, the light is first dispersed into n spectral bins and then is split into two or more beams.

In the first basic embodiment, the appropriate spectral bins in one of the beams from a first pixel are then individually acted upon by individual spatial light modulators in accordance with the positive components of an optimal spectral basis vector. The appropriate spectral bins in the second beam from the first pixel are also individually acted upon by individual spatial light modulators in accordance with the negative components of the same optimal spectral basis vector. The outputs from the two photodetectors are then differenced to now represent the hyperspectrally filtered light from the original pixel as defined by the optimal spectral vector.

In the second basic embodiment, the light from an individual pixel is first split into the n spectral bins. This is still considered to be a single beam at this point, but one that has been spread out into its spectral "colors." Each of the n colors is then acted upon by a modulator that takes the form a micromirror or other spatial light modulator that can throw the light into at least two directions. Normally only two directions will be used, and the light will then be spit into two beams. One of the directions will correspond to the positive components of the optimal spectral basis vector, and the other direction will correspond to the negative components of the optimal spectral basis vector. An array of photodetectors sits on the image plane of the light for the "positive" beam for each of the spectral bins, and another array sits on the image plane of the light for the "negative" beam. The outputs from the two photodetectors are again differenced to now represent the hyperspectrally filtered light from the original pixel as defined by the optimal spectral vector.

Hence, in either embodiment one starts out by imaging one pixel and ends up with an output for that one pixel that has been optimized for a particular application such as spectrally separating a potential target from the surrounding background or otherwise emphasizing an aspect of the scene. Typically, the original pixel is one of many in a linear array of pixels in a "push broom" detector that sweeps across a scene to provide a two-dimensional array of pixels. Often it is useful to use two or more spectral basis vectors to process the data optically. This can be done simultaneously if one constructs the system such that other sets of spatial light modulators and detectors are employed to provide combined outputs at other output pixels.

There are several different ways to set up these systems. They will depend upon the type of spatial light modulator being used, the number of spectral basis vectors one wishes to process simultaneously, and the desired resolution of the system, among other factors. In most preferred embodiments, the spatial light modulators can be reconfigured in microseconds to milliseconds by a control system to apply different spectral basis vectors to the light received from the scanned scene in order to look for different targets.

This invention reduces the dimension of the spectral data to a few channels per pixel from the hundreds required in a classic hyperspectral imaging system (HIS). It also significantly improves the signal-to noise (S/N) ratio for a given computation while reducing the need for high data rate systems with their concomitant weight and complexity burdens. When used in mapping or geophysical applications, these two improvements allow the programmable hyperspectral sensor of the present invention to search huge areas rapidly, yet with high resolution. When used in other applications, such as medicine, the improvements permit near real-time identification and analysis of targets in data-rich environments. Finally, it uses the encoded spectra directly thus simplifying classification and quantification.

BRIEF DESCRIPTION OF THE SEVERAL VIEWS OF THE DRAWING

FIGS. 4a and 4b are diagrams of two embodiments of the invention employing micromirrors as modulators.

FIG. 5 is a detail from FIG. 4 showing the micromirror array with the slit perpendicular to the plane of the paper.

FIGS. 6 and 7 are cut away perspective views of two types of micromirrors.

DETAILED DESCRIPTION OF THE INVENTION

This invention is based upon a new optical technique to utilize some reasonably well known mathematics to do hyperspectral filtering. As in most forms of hyperspectral filtering, one begins with a data base of collected spectra of many different types of materials—all the different background materials one expects to see in meaningful amounts and all the targets one is seeking in the scanned images. This data base, often called a training set, is collected with the same type of sensor system one will be using later to detect the targets. The sensor system will have a similar number of spectral bins that the light is dispersed into, typically by a prism or a diffraction grating, and the same photodetector response as does the sensor that will be used to detect the target. In this manner, one will know beforehand what spectral bins (wavelengths) contain the information most useful to detect a particular target or the background and the relative amplitude of the light in the selected bins. This preliminary data will consist of a signal strength of from zero to some positive value in each of the spectral bins across the relevant spectrum for all the tested materials in the training set.

In a normal n-dimensional hyperspectral data set (defined by the n spectral measurements) for a scanned scene containing background and target(s), there will be a group of data points that will fall into a cluster (or clusters) that lie in a region (or regions) of the n-dimensional space that are separated from other regions of data points that describe the background information. However, at this preliminary stage, it is difficult to use this information directly.

By performing an affine transformation, one can define a new coordinate system that has a reference plane therein that separates the target data group from the background data groups in the transformed n-dimensional space. The affine transformation is on the training data set. The vectors are the definition of the optimal affine transformation to separate the spectral dusters contained in the scanned scene The vectors from the origin of the new coordinate system to the various transformed data points for the target and the background can be used to create a spectral basis vector that can act as a hyperspectral filter vector to pass information that maximizes the separation of the target from the background. This spectral basis vector is an arbitrary spectral transmission function with positive or negative weights assigned to each of the spectral bins, wherein the weights are derived through orthogonal subspace projection of the original n dimensional spectral data via the affine transformation discussed above.

Figure 1A:
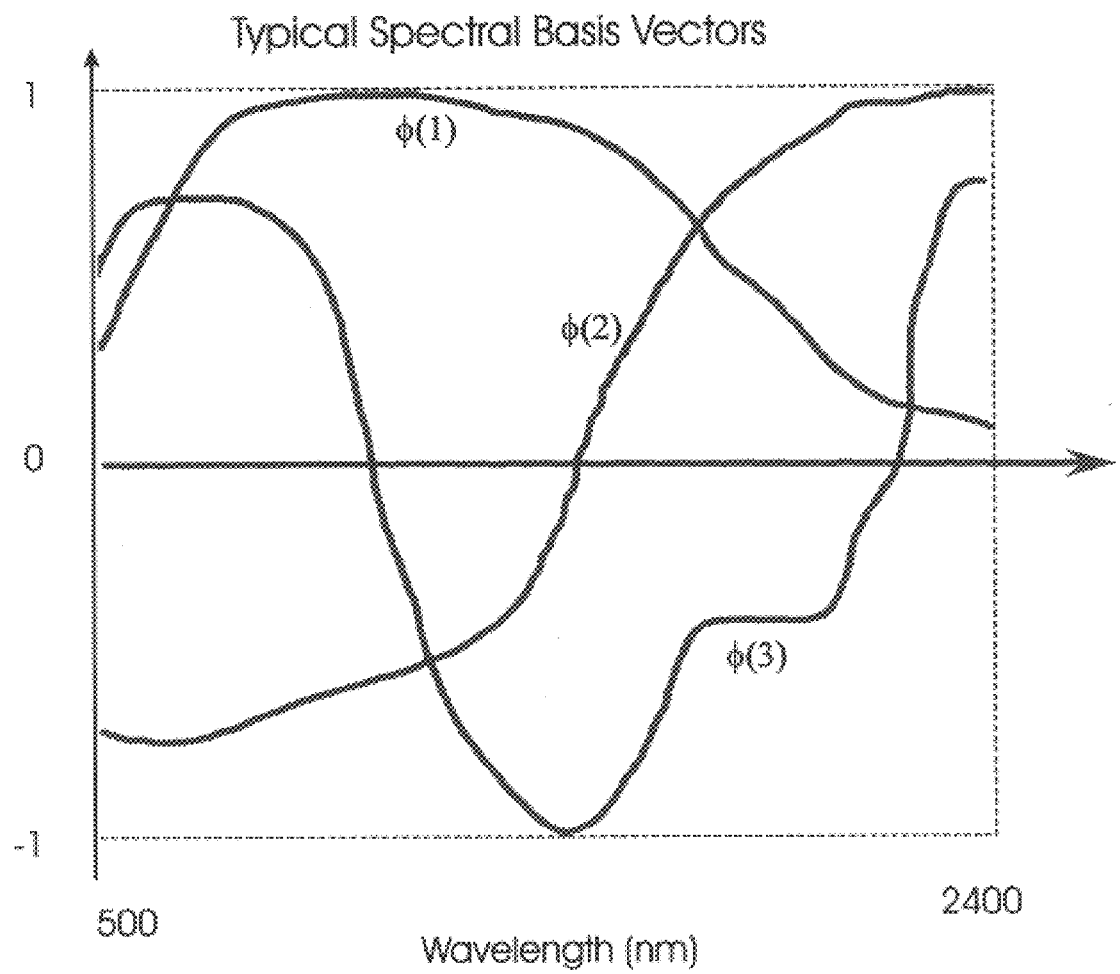
FIG. 1a is a graph showing three basis vectors.
Figure 1B:
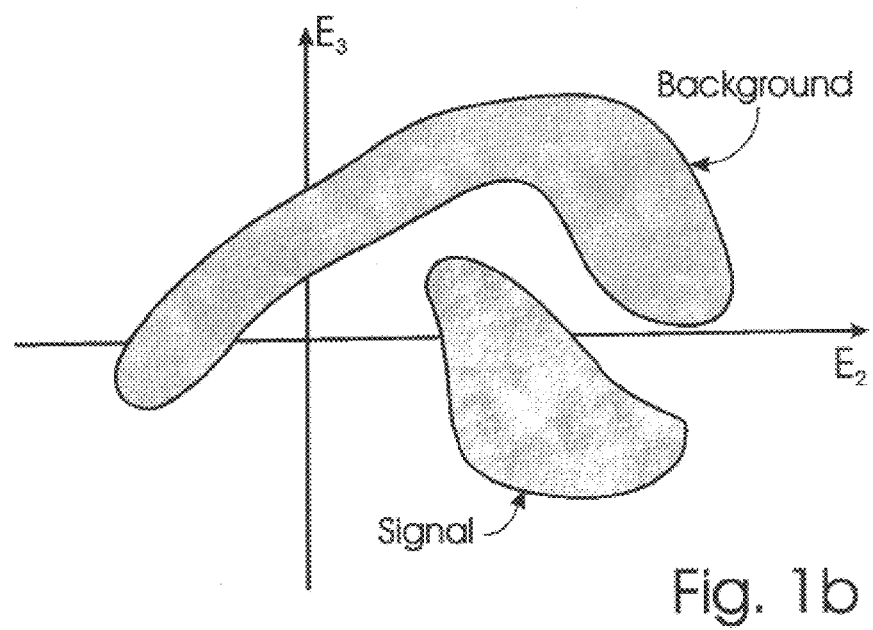
FIG. 1b is a graph showing a scatter plot of the clustering for two dimensions of target and background spectral signatures in a reference database.
Figure 2:
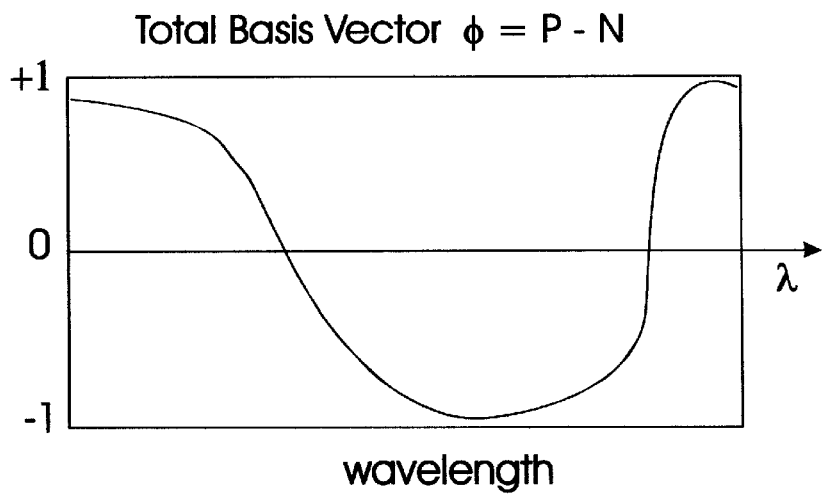
FIG. 2 is a graph showing a spectral basis vector created from data similar to that in FIG. 1b.
Figure 3A:
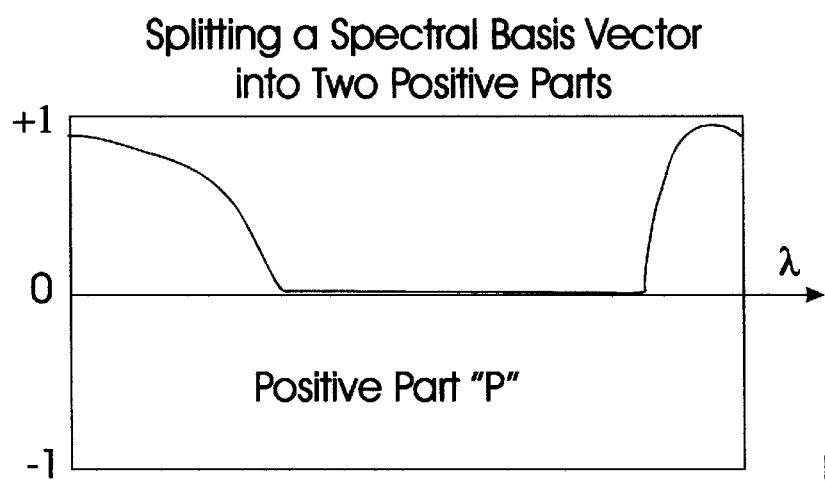
FIGS. 3a and 3b are graphs derived from FIG. 2 and show how the positive and negative portions of the spectral basis vector can be changed into two separate positive only basis vectors.
Figure 3B:
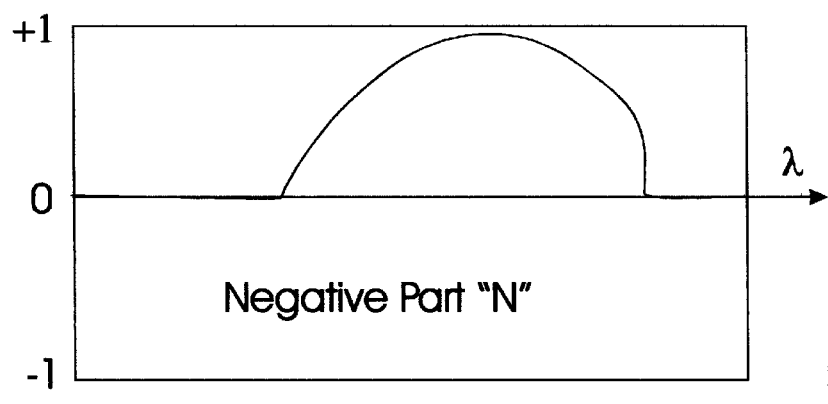

FIG. 1a shows three typical basis vectors taken across the usual spectral range and having values between 1 and −1. $\Phi_1$ is representative of an illumination source. $\Phi_2$ and $\Phi_3$ are basis vectors for materials, one of which could be a target and the other the background. The clustering of the target and background data is shown in FIG. 1b after an affine transformation has been made. A resulting spectral basis vector used to detect a particular material is shown in FIG. 2. FIGS. 3a and 3b show how the spectral basis vector of FIG. 2 with its positive and negative parts can be separated into two positive parts (with one being subtracted from the other in a subsequent combining operation. The spectral basis vector (there can be several spectral basis vectors that are handled separately) operates upon the hyperspectral data collected from the pixels in the imaged scene via a dot product operation to maximally separate the target and background samples in the scene.

Heretofore, the processing of hyperspectral data for an imaged scene with the spectral basis vector(s) has only been done in conventional electronic computers after the complete hyperspectral data set describing a scanned scene has been optically collected, read out as electronic signal strengths from detectors in each of the n spectral bins in each of the m pixels in each row of pixels in the detector for every row needed to capture the scene, stored and then sent to the electronic computer for processing with the pertinent spectral basis vector for the particular target being sought.

The advance herein is the recognition that much of the post-collection electronic processing can be avoided by creating a sensor system that will provide for the real-time optical computation of the dot product between vectors representing the collected data and the spectral basis vector within the optical system of the sensor itself.

There are a number of techniques to generate spectral basis vectors from a hyperspectral data set of background materials and targets. These techniques include, but are not limited to principal components analysis (PCA), projection pursuit (PP), and independent component analysis (ICA), and factor analysis. Many of these techniques can be found in standard reference texts such as Fukunaga, *Introduction to Statistical Pattern Recognition,* Academic Press, 1990; Everitt, *Cluster Analysis,* Halsted Press, 1993; Jackson, *A Users Guide to Principal Components,* John Wiley and Sons, 1991; Scott, *Multivariate Density Estimation Theory, Practice and Visualization,* John Wiley and Sons, 1992. The principal components analysis method works well and is described in more detail below.

The general problem is described by the matrix equation below.

$$O = S \cdot \Phi \qquad \text{Eq. 1}$$

Where O is the observed vector produced after the conventional spectrum vector S of the scene has been encoded by the encoding matrix $\Phi$. The encoding matrix $\Phi$ is a square matrix of dimension n equal to the number of spectral elements or bins and is implemented in the real world as a truncated version thereof by the action of the spatial modulators in the sensor optics. The size of the matrices of Eq. 1 is as follows:

$$[1 \times n] = [1 \times n] \cdot [n \times n] \qquad \text{Eq. 2}$$

But what is needed is a truncated version of the transpose of $\Phi$ that will approximately recover the original scene vector S from the observed vector $\mathbf{0}$ ($\mathbf{0} \cdot \Phi^t \approx S$). Here $\mathbf{0}$ will have the dimension of [1×m], and the truncated version of $\Phi$ will have the dimensions [1×m], where m is less than n.

One way to form this truncated encoding matrix is to use as its rows the lead principal components derived from the set of S's that represent the problem at hand. The principal components are directions in the n-dimensional space that contain decreasing variability. It is useful to use the first principal component to emphasize the variability between the target and the background. Combinations of principal components are used to identify materials. Principal components are the eigenvectors of the covariance matrix constructed as follows:

$$\Sigma = T^t \cdot T, \qquad \text{Eq. 3}$$

where T represents a training set of mean centered spectra that is any size from [1×n] to [∞×n], and $\Sigma$ is always [n×n], the superscript t indicates the matrix transpose. The greater the number of representative spectra contained as rows in T, the more certain it will be that $\Sigma$ is an adequate estimate of the true covariance matrix. When the eigenvectors of $\Sigma$ are calculated, they appear in descending order of corresponding eigenvalue. The relationship being:

$$\Sigma x = \lambda x, \qquad \text{Eq. 4}$$

where λ is a scalar eigenvalue and x is an eigenvector. The numerical values for the elements in the eigenvector can be either positive or negative. The highest value eigenvalue is coupled with a particular eigenvector, which now becomes the first principal component. Linear combinations of the principal components can be developed into spectral basis vectors, $\phi_j(\lambda_i)$, that maximally separate the scenes component materials. The more of these linear combinations that are retained, the better the discrimination of the material types. Sometimes a single vector is all that is required to discriminate between target and background, $\phi_{target}(\lambda_i)$.

The magnitudes and signs of the various elements of this spectral bass vector are used to determine the amount of attenuation that needs to be introduced by the spatial light modulators in their respective spectral bins in one or the other of the two beams of collected light in the optical system of this invention.

The basis vectors shown in FIG. 1 are orthogonal to one another, and so can qualify as eigenvectors. This is a desirable quality and seems to maximize the separation of regions such as the "target" and "background" in the non-limiting example discussed in conjunction with FIGS. 1a, 1b and 2. However, when there are several target materials being sought and only a limited number of basis vector channels, then greater overall differentiation may be achievable when the basis vectors are not orthogonal.

A spectral basis vector is defined in this application to have the following property:

$$S_{target}(\lambda_i)\cdot\Phi_{target}(\lambda_i) > S_{bkgd}(\lambda_i)\cdot\Phi_{target}(\lambda_i)\cdot\{1+\beta\} \qquad \text{Eq. 5}$$

where the constant β is large enough to easily differentiate the output signal of a target-filled pixel from one filled with any of the possible background materials. This must be true in the presence of all noise sources that may be encountered. Extreme limits on the spectral vector's components are $$-1 \leq \Phi_{target}(\lambda_i) \leq +1 \qquad \text{Eq. 6}$$

All of the spectral basis vectors of interest usually have both positive and negative parts.

Splitting the spectral basis vector, $\Phi_{target}(\lambda_i)$, into two parts enables all of the positive components to be put in one vector, $P_{target}(\lambda_i)$, and all the negative components to be put in another, $N_{target}(\lambda_i)$. Thus, $$\Phi_{target}(\lambda_i) = P_{target}(\lambda_i) - N_{target}(\lambda_i) \qquad \text{Eq. 7}$$

where all of the components of $P_{target}(\lambda_i)$ and $N_{target}(\lambda_i)$ are positive. Thus, the values of $P_{target}(\lambda_i)$ and $N_{target}(\lambda_i)$ can have values from zero to one. Therefore, specially configured optics, including most of the spatial light modulators (SLMs) and some of the digital micromirrors discussed herein, can be used to take the dot product described by Equation (5). For example, the dot product of the collected hyperspectral signal in a pixel and the positive part of the basis vector for target, $$C^+_{target} = S_{Scene}(\lambda_i)\cdot P_{target}(\lambda_i) \qquad \text{Eq. 8}$$

can be directed toward a first channel or as a beam by some form of SLM, such as an array of micromirrors. (This hardware will be explained in more detail below). Similarly, the negative part of the product, $$C^-_{target} = S_{scene}(\lambda_i)\cdot N_{target}(\lambda_i), \qquad \text{Eq. 9}$$

can be directed toward a second channel.
In a simplified target detection example, this difference can be normalized to remove the effects of solar flux, shadowing, etc. by dividing by the sum of the two components;

$$F(\text{likelihood})_{target} = (C^+_{target} - C^-_{target})/(C^+_{target} + C^-_{target}) \qquad \text{Eq. 10}$$

There will be target material located in the pixel if this value is greater than some empirically pre-determined constant $K_{target}$;

$$\text{Likelihood}_{target} > K_{target} \qquad \text{Eq. 11}$$

Values less than this indicate a probability that only background materials are in the scene.

More complex target detections techniques using multiple vector measurements can be found in the references noted above.

Equations 7–9 give a proper description of the basis vectors for many systems, for example the micromirror-based systems (i.e. the systems shown in FIGS. 5 and 11) discussed below that do not utilize all of the light collected by the system. However, other systems that utilize all of the light (i.e. the systems shown in FIGS. 8a, 8b and 8c) require a different formalism as described below in conjunction with Eqns. 12–15. The systems illustrated in FIGS. 4a, 4b and 4c can be utilized in either fashion, depending upon how the micromirrors are employed.

To find "target" material, the liquid crystal SLM should be programmed to rotate the polarization of some of the light in each selected portion of spectral information to achieve to the following spectral filter function:

$$Q^+_{target}(\lambda_i) = \{1+\Phi_{target}(\lambda_i)\}/2. \qquad \text{Eq. 12}$$

Therefore the detector's output signal in the rotated beam, summed by the detector, will be proportional to:

$$O^+ = Q^+_{target}(\lambda_i)\cdot S_{scene}(\lambda_i) \qquad \text{Eq. 13}$$

The residual, the part of the signal where the polarization is unrotated, will then be proportional to:

$$O^- = \{1-Q^+_{target}(\lambda_i)\}\cdot S_{scene}(\lambda_i), \qquad \text{Eq. 14}$$

The "normalized" dot product of the spectral radiance of the scene and the spectral basis vector for target, Equation(5), is proportional to the difference between the rotated and the unrotated ($E^+$ & $E^-$) signals divided by the sum:

$$S_{scene}(\lambda_i)\cdot 101_{target}(\lambda_i) = K(O^+ - O^-) \div (O^+ + O^-) \qquad \text{Eq. 15}$$

where K is a constant. This result can also be intensity normalized using a similar technique shown in Eq. 10.

The mathematics underlying the present invention now having been generally described above, it is apparent that the invention can be constructed in several different embodiments.

Figure 4A:
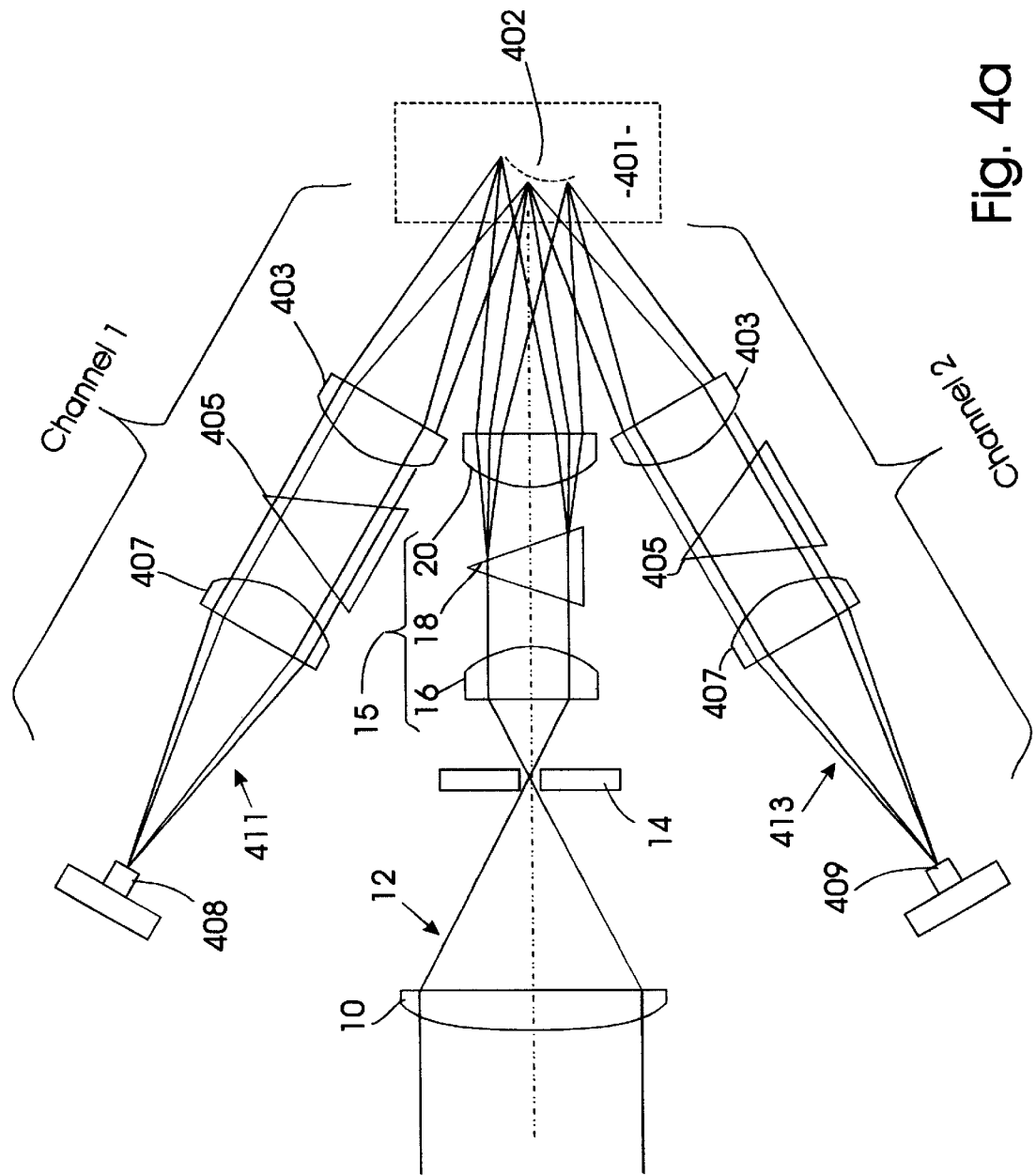

FIG. 4a discloses a first embodiment of the invention. SLM 401 comprises an array of individual micromirrors 402. As with other hyperspectral systems, the scene is imaged by a telescope or other suitable imaging device 10 onto slit 14. The light 12 is recollimated by lens 16, dispersed by light dispersing device 18, and the dispersed slit image is imaged by lens 20 onto the array of individual micromirrors 402. The individual micromirrors 402 are long and narrow (similar to the slit 14) and are mounted parallel to slit 14 (FIG. 4b). The slit 14 is imaged onto each micromirror 402 in the array. Because of the light disperser 15, the slit images on any one of the micromirrors 402 will be created within narrow wavelength bands that do not overlap spectrally. Each of the programmable micromirrors 402 in the array can direct all or part of a specific spectral component into either channel 1 or channel 2 as shown in FIG. 4a. The micromirrors could also be arrayed as a row of individual square or rectangular micromirrors of the same total dimensions as the long narrow single micromirror 402. As with 402, the tilted positions of all these individual mirrors in the row would be alike.

In FIG. 4a, light 411, directed into channel 1, is recollimated by a lens 403. A light disperser 405, such as a prism or grating or combination of both a prism and a grating, is shown, but is not required, though it can be used to overlap the spectra so the size of the optical detector elements in each of a pair of linear optical detector arrays 408 and 409 can be smaller and therefore less electrically noisy. Lens 403 and lens 407 together image the micromirror array onto optical detector arrays 408 and 409. The length of the slit 14 is imaged onto the length of the optical linear detector arrays 408 and 409. Light disperser 405 can be used to shrink the size of this light bundle 411 in the direction perpendicular to the length of the micromirror 402. A lower channel 2 is identical to the upper channel 1, however, channel 2 directs spectra toward linear optical detector array 409.

The SLM 401 is used to program the spectral basis vector into the system. A different spectral band impinges on each micromirror 402. For a particular spectral component, if the spectral basis vector (i.e., $\phi_{target}(\lambda)$) is positive, the micromirror associated with that wavelength should direct the light impinging on it into the channel representing the positive part of the dot product of the object spectrum and the spectral discriminant vector, yielding $C^+_{target}$ defined by Equation (8). This sum or integral might be created in channel 1 of FIG. 4a on detector 408. The negative part of the integral, $C^-_{target}$, is defined by Equation (9) and can be created on the detector 409 using channel 2.

If the micromirror 402 is rotated to either the "+1" or "−1" position, all of the light goes into one of the two channels. This would be covered by Equations 12–15. In creating the sums $C^+_{target}$ and $C^-_{target}$, it is often desirable to be able to direct a fraction of the light in a spectral channel into one of the two channels. This is possible by tilting each micromirror 402 to a fraction of either the "+1" or "−1" positions. Apertures (not shown) are required in the channels 1 and 2 of the system for the purpose of clipping any beams that are not centered in these apertures. These apertures are ideally located in or near the plane conjugate to the system entrance pupil, not far from light disperser 405 in each channel. The signal for a spectral channel can also be modulated by using more than one micromirror per channel, with some tilted to the "off" position and some to the "on" position or by averaging the signal across adjacent spectral bands. These other techniques would be covered by Equations 7–11 since some of the system light is not utilized.

FIG. 4b is a compact version of the micromirror based programmable hyperspectral processor system shown in FIG. 4a, wherein several components perform multiple functions. In FIG. 4b, a lens 429 performs the functions of lenses 16 and 407 of FIG. 4a, a light disperser 432 performs the functions of light dispersers 18 and 405 of FIG. 4a, and a lens 435 performs the functions of lenses 20 and 403 shown in FIG. 4a. Common to both figures is SLM401 which is again comprised of an array of individual micromirrors 402 that reflect the spectrally dispersed light back through the light disperser 426 before passing through a pair of steering optics 444, such as a prism. The purpose of optics 444 is to steer the spectrally dispersed light to an optical-detector unit 447 comprised of individual linear optical detector arrays 450. Each linear optical detector array 450 can have any number of pixels. By way of example, detector array 450 can have 2048 square pixels of thirty micrometers (30 $\mu$m) dimension such that array 450 effectively acts as the slit. The two detector arrays 450 can be located beside each other, or fabricated on a common substance 447 as shown in FIG. 4b. The two wedged prisms 444 in the system move the two images of the slit away from slit 14. In FIG. 4b, the images are below the slit and not overlapping because the wedge angles of the two prisms 444 are different. Although the optical programmable hyperspectral processor using a micromirror array for the SLM 401 can be configured as shown in FIGS. 4a and 4b, these configurations are simply exemplary embodiments.

An alternative embodiment is shown in FIG. 5. The detector unit 447 is disposed close to mirror array SLM 401, so that the light does not pass through a re-imaging system before being received by optical detector unit 447, as in the embodiment of FIGS. 4a and 4b. In this embodiment, SLM401 includes a plurality of bar-shaped micromirror s (approximately 32–64), indicated schematically by micromirrors 402. As an example, these bar-shaped mirrors cold be are about 100–150 $\mu$m wide and about 15 mm long. The slit and bar mirrors are perpendicular to the plane of the paper in FIG. 5. The dispersion is done in the plane of the paper. For this system to work correctly beam re-imaging optics, for example, shown in FIG. 4a, must produce an astigmatic beam. Referring to FIG. 5, the focus in the plane of the paper is in the plane containing the micromirrors 402 while the orthogonal focus is in the plane containing the opticaldetectors 450. (The pixels in the detector array are tall and thin because the slit image perpendicular to the slit is defocused at the detector plane.)

The steering or directing of light 436 by micromirrors 402 can also be done with an array of micromirrors discussed below, as depicted in FIGS. 6 and 7. Alternatively, a two-dimensional array of sixteen by sixteen micrometers (16×16 $\mu$m) micromirrors on seventeen micrometers (17 $\mu$m) centers can be adjusted. In a basic digital micromirror device (DMD) developed by Texas Instruments, Inc., each mirror is hinged about an axis through two opposite corners, e.g., the upper right (northeast) and lower left (southwest) corners. These micromirrors are tilted using an electrostatic force that is applied by electrodes located behind the other two corners of each mirror (northwest and southeast). When an electrode is charged, it pulls the nearby mirror corner down until there is physical contact. Thus, there are two locked and contact positions and these provide mirror tilt angles of ±10°. If the array is illuminated normally, the individual micromirrors will reflect the light at an angle of 20° from the array normal in either the northwest or southeast directions. However, a mirror array implemented for programmable hyperspectral imaging requires that the micromirrors tilt about axes parallel to one of the array coordinates. By rotating the basic DMD by 45° about the substrate normal and deleting every other row, leaving a square array of drive units on 24 Jm centers (17×√2 is approximately 24), each of the remaining drive units can be deposited with a square mirror that is 23 $\mu$m on a side rather than the 17 $\mu$m for the basic DMD. Rotating this modified DMD by 45° about the substrate normal from the usual orientation provides micromirrors that tilt about the axes parallel to one of the array coordinates.

The mirror arrangements shown in FIGS. 4a, 4b, and 5 use long, narrow micromirrors (for example, 20 mm×100 $\mu$m) tilted about their longitudinal axes. Therefore, instead of having the long micromirrors configured as shown in FIGS. 4a, 4b, and 5, the modified DMD arrangement can be used to replace each long mirror by approximately four rows of the small square micromirrors that are all tilted at the same angle. Approximately 400 rows of micromirrors in a modified DMD mirror array, arranged side-by-side, would give good spectral resolution for many imaging problems. The number of micromirrors in each row is a function of the slit length and the system magnification. With the embodiment using the modified DMD array described above, 400 rows of micromirrors are probably more spectral resolution than is needed. If only 100 rows were needed, then the redundancy would allow four "gray levels".

FIG. 5 shows another mirror array architecture that is similar to that shown in FIGS. 4a and 4b. The spectrally dispersed light 436 converges at a moderate angle, typically F/10 and is reflected off of SLM (mirror array) 401 wherein the micromirrors 402 are arranged in an arc matching the curvature of the image plane. As noted above, micromirrors 402 reflect the spectrally dispersed light directly to optical-detector array 447 and the individual optical detectors 450 without having the spectrally dispersed light passed back through the dispersal system. This has the advantage that the system is simpler and the spectrally dispersed light beams suffer fewer transmitting surfaces so the system throughput is more efficient. However, the opticaldetectors 450 in this embodiment must be considerably larger since the light is not focused on them in the plane of the paper in FIG. 5. This results in more noise. It is noted that a real slit (not shown) is required with this embodiment.

In a specific implementation of the embodiment depicted in FIG. 5, the mirror array 401 is comprised of thirty-two micromirrors having center spacing approximately equal to 200 $\mu$m. Each mirror 402 has a length of about 25 mm and can be tilted ±0.050 radians about its face. It is desirable to have an angular resolution of approximately 0.005 radians. The optical detector array 447 is shown as having three rows of pixels. The outside rows read $C^+_{target}$ and $C^-_{target}$, and the center row measures the unwanted light, which may be useful for some data reduction calculations. Each row contains 512 pixels with each pixel having a dimension of 500 $\mu$m by 50 $\mu$m.

FIGS. 6 and 7 illustrate embodiments of the individual micromirrors 402 of the mirror arrays 401 of FIGS. 4a, 4b, and 5. In general, movement of the mirror arrays of these embodiments can be achieved by rotating mechanical levers (not shown) or by electrically inducing movement with the modified micromirror array. In FIG. 6, the individual mirror surface 690 of each mirror 602 is supported in spaced parallel relation to and mechanically connected to a substrate 692 by a support element 694 provided at one edge thereof. A free end 696 of each mirror 602 is moved forward or away from the mirror substrate thus adjusting the mirror angle using a deflection device (not shown) located between mirror end 696 and a substrate 692. The deflection device can take the form of a capacitance device placed between electrode contacts. This allows the electromagnetic field, generated between the electrode contacts, to be varied. By altering the amount of voltage disposed between the electrode contacts, mirror tilts can be adjusted.

FIG. 7 illustrates an embodiment similar to that of FIG. 6. In this embodiment, mirror 702 has a U-shaped configuration. The outer surface 700 of each mirror 702 is connected at an edge or end 706 thereof to a buffer member 710 which is, in turn, connected at the opposite edge or end thereof to a substrate 712 by a support element 704. With this arrangement, a deflection device (not shown) similar to that used for the micromirrors in FIG. 6 (also not shown), is used to attract the mirror 702 toward the substrate. The mirror surface 700 is unstressed and thus remains substantially flat. The deflection device employed can be the same as that used for the micromirrors in FIG. 6 where a voltage is varied between mirror end 706 and the substrate to allow for adjustment of the micromirrors.

Figure 8A:
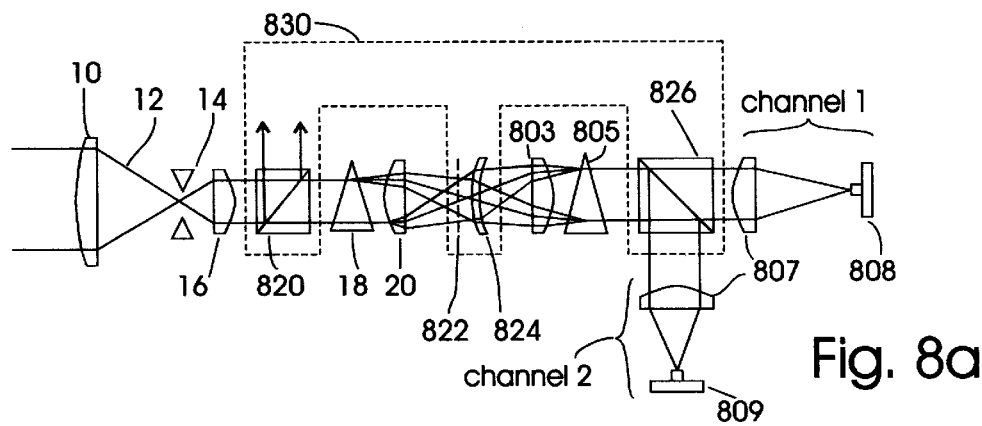
FIGS. 8a, 8b and 8c are diagrams of three embodiments of the invention utilizing polarizers and liquid crystal attenuators.

Another embodiment of a programmable SLM is shown in FIG. 8a. This embodiment has a programmable liquid crystal based SLM 830 comprised of liquid crystal 822 and a pair of polarizers 820 and 826, rather than the micromirror array shown in FIGS. 4a, 4b, and 5. Although liquid crystals are the normal technology used to impart polarization, other techniques could be substituted. The active windows of liquid crystal 822 are long and narrow and parallel to slit 14. They are shown as the spaces between the dashes 822 in FIG. 8a. In this architecture, a first light polarizer 820 polarizes the input beam 12 after it passes through the slit 14 and is re-collimated by lens 16. The light is spectrally dispersed by light disperser 18 (i.e., a prism or a grating or a combination of prism and grating) before the dispersed slit image is created by lens 20 in conjunction with lens 16 and light disperser 18. The light polarizer 820 and the light disperser 18 may be juxtaposed. The field lens 824 is optional, depending on image quality requirements in a given application. LCD 822 rotates the polarization of each spectral component by a predetermined amount as will be described subsequently. A lens 803 re-collimates the light before the optional light disperser 805 reduces the dispersion introduced by light disperser 18. Polarizer 826, commonly called an "analyzer," reflects the fraction of the light whose polarization has been rotated by LCD 822 along channel 2 towards optical detector 809, and transmits the unrotated fraction of the light along channel 1 toward optical detector 808. The light traveling along channel 2 encounters lens 807 that images the slit onto optical detector array 809. The light traveling along channel 1 encounters lens 807 that images the slit onto optical detector array 808.

A spectral basis vector $\phi_j(\lambda)$ is programmed into the liquid crystal SLM 830 as described in Equation (12). The signal impinging on detector array 809 is $C_j^+$, as described in Equation (13), and that impinging on detector array 808 is $C_j^-$, as described by Equation (14), or vice versa. The normalized dot product of the light from the scene and the $j^{th}$ spectral basis vector can be calculated from $C_j^+$ and $C_j^-$ as shown in Equation (15). Note that we choose equations 12–15 rather than 7–11 because none of the light is rejected by the SLM. All of it falls on detector array 808 or 809.

Figure 8B:
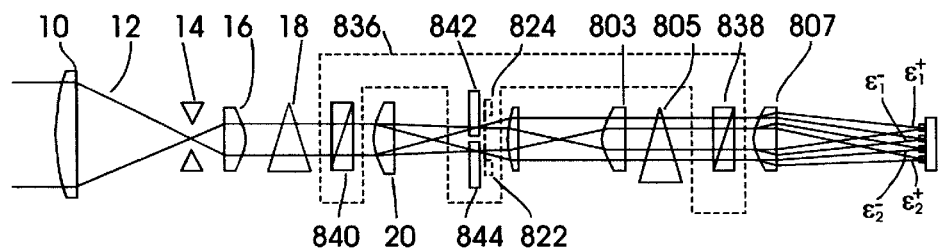
Figure 8C:
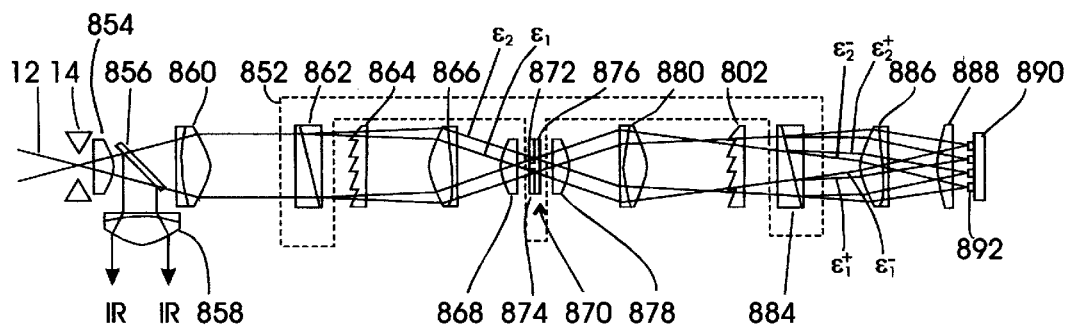

A compact version of the liquid crystal-based programmable hyperspectral processor, as depicted in FIG. 8a, is shown in FIG. 8b. The configuration in FIG. 8b allows the dot product of the signal beam $S_{scene}(\lambda)$ and two basis vectors, i.e., $\phi_1(\lambda)$ and $\phi_2(\lambda)$, to be taken simultaneously. The functions of common-numbered elements are the same as in the description of FIG. 8a. FIG. 8b shows a different configuration for the SLM 836, one such difference being the "analyzer." The "analyzer" 826 in FIG. 8a is shown as a common prism polarizer whereas in the compact design of FIG. 8b, a polarizer 838 (chosen from the group of: a Wollastan Prism, a Rochon Polarizer; a Séramont Polarizer, and a thin, i.e., less than approximately 10°, wedge of Calcite, said wedge having its principal axis parallel to said entrance face of said liquid crystal device), separates the two cross-polarized beams by a small angle. Polarizer 838 separates the two polarized light beams by an angle of approximately $\theta_{p1}=2°$. This allows separation of the two linear optical detectors, i.e., $E_1^+$ and $E_1^-$, onto an optical detector array 846. The first light polarizer 820 in FIG. 8a has also been replaced by a polarizer 840 in FIG. 8b chosen from the same group as Polarizer 838. This prism separates the light beams by an angle different than that introduced by analyzer 838, (e.g., $\theta_{p2}=4°$). SLM 836 also uses a half-wave plate 842 that has been inserted to rotate the polarization of the second beam so both beams can be rotated by LCD 822. An optional plane 844, a parallel plate of glass or crystalline material (also known as a window), has been inserted into the unrotated light beam so that the two light beams will focus at the same plane, which is at LCD 822.

In FIG. 8$b$, there are two physically well separated, spectrally dispersed, polarized images of the slit projected on LCD 822. LCD 822 has a large number (e.g., 256) of individually addressable apertures. Typically one needs about 100 apertures to program a spectral basis vector. Thus, there is enough room on LCD 822 to program two spectral basis vectors as instructed in the description of Equation (12). So, spectral basis vector $\phi_1(\lambda)$ could be programmed (per Equation (12)) in the lower half of the SLM and $\Phi_2(\lambda)$ could be programmed in the top half, and both halves could be simultaneously illuminated by the spectrally dispersed light from the scene. Re-collimating lens 803 and light disperser 805 have the same functions as previously described. A polarizer chosen from the same group as Polarizer 838, acting as an "analyzer," separates in angle the parts of the two optical signals (that have and have not been rotated by LCD 822). Lens 807 creates four images of the slit on optical detector array 846. These four optical signals are $E_1^+$, $E_1^-$, $E_2^+$, and $E_2^-$, as generically specified in Eqns. (13) and (14), where the subscripts are associated with basis vectors $\phi_1(\lambda)$ and $\phi_2(\lambda)$. The dot products of the scene illumination, $S_{scene}(\lambda)$, and two basis vectors, $\phi_1(\lambda)$ and $\phi_2(\lambda)$, can then be calculated (for example, using digital electronics) from Equation (15).

FIG. 8$c$ illustrates an embodiment similar to that disclosed in FIGS. 8$a$ and 8$b$ in that it is also directed to a programmable SLM 852 that uses basis vectors. In FIG. 8$c$, a light beam 12, collected from a light collector such as a telescope (not shown), is imaged through a field stop 14 onto a field lens 854. The white light emerging from field lens 854 encounters a dichroic 856 which separates, for example, the short wave infrared (SWIR) wavelengths (i.e., 1.05–2.5 $\mu$m) from the visible/near infrared (NIR) wavelengths (i.e., 0.4–1.05 $\mu$m). The SWIR wavelengths are shown being reflected off dichroic 856 and passing through a collimating lens 858. These SWIR wavelengths will proceed through a system that is nearly identical to that described below through which the visible/NIR wavelengths pass.

The visible/NIR wavelengths, after passing through the dichroic 856, proceed through a collimating lens 860. Next, the collimated light passes through a first polarizer 862 (chosen from the same group as Polarizer 838) of SLM 852 which splits the collimated light into two bundles of rays, $E_1$ and $E_2$, that diverge at a very slight angle, i.e., ~5°, towards a device 864, such as a grating or prism, for separating the light into its component spectra. FIG. 8$c$ depicts the device 864 for separating the light into its spectra as a grating, although, as mentioned previously, this can be combined with or replaced by a prism. The spectrally separated light emanating from grating 864 passes through a re-imaging lens 866 and a field lens 868 so that each of the two bundles of rays, $E_1$ and $E_2$, are re-focused and separated from each other by imaging one bundle, $E_2$ on the top half of modulator system 870 of SLM 802 and the other bundle, $E_1$, on the bottom half of modulator system 870 of SLM 852.

The two separated bundles of rays of light, defined as $E_1$ and $E_2$, that emanate from field lens 868 are used to generate the dot product of the scene's spectra and the two corresponding basis vectors to be used for material classification. Modulator system 870 comprises a half-wave plate 872 that rotates the polarization of light $E_2$ by 90° so that this light is polarized vertically, as light $E_1$. Modulator system 870 also contains a path length compensator 874. Light $E_1$ passes through path length compensator 874 which has a length equal to the half-wave plate 872 so that light bundles, $E_1$ and $E_2$, both create slit images on LCD 876 of SLM 852. LCD 876 rotates the polarization of the spectral components of light bundles, $E_1$ and $E_2$ according to Eqns. (13) and (14).

The light emanating from modulator system 870 passes through a field lens 878 and a re-collimating lens 880 which together collimate each spectrally dispersed beam (bundle of rays), $E_1$ and $E_2$, before passing it through a device 882 for spectral recombination. Spectral re-combination device 882 can be a grating or prism which reassembles the spectrally dispersed wavelengths before passing the light beam (bundle of rays) through a second polarizer 884 (chosen from the same group as Polarizer 838) which separates positive and negative components of each beam (bundle of rays), $E_1$ and $E_2$ These positive and negative components will later correspond to similar components of a basis vector used to identify scanned material. The angle of divergence of the two beam centerlines emanating from polarizer 884 is slightly less than the angle of divergence of the four beams departing a polarizer 862 (chosen from the same group as Polarizer 838), i.e., ~2° divergence. FIG. 8$c$ illustrates four roughly collimated beams (bundles of rays) emanating from polarizer 884, labeled $E_1^+$, $E_1^-$, $E_2^+$, $E_2^-$. All of these beams (bundles of rays) pass through re-imaging lens 886 and field lens 888 that image them on linear optical detector array 890. FIG. 8$c$ illustrates an embodiment wherein linear optical detector array 890 comprises four detectors 892 that receive $E_1^+$, $E_1^-$, $E_2^+$, and $E_2^-$, respectively.

The main difference in the SWIR system from the system through whichpass the Visible/NIR wavelengths of FIG. 8$c$ is the type of lens materials used. The lens pairs listed in the preceding paragraph are replaced by a calcium fluoride lens ($CaF_2$) positioned next to a light flint glass (LFG) lens which images light in the visible to NIR range (0.4–1.05 $\mu$m) onto an SF57 lens paired with a $CaF_2$ lens so that a 1×1 cm image plane is produced.

As previously mentioned, in FIG. 8$c$, beams (bundles of rays) of SWIR, reflected to lens 858 from dichroic 856, go to a system that is nearly identical to that used for the Visible/NIR light passing through elements 860–888 and detected by 892. As above, the pairs of lens listed for the SWIR range are replaced by a configuration, not shown, in which a germanium (Ge) lens is paired with a silicon (Si) lens to image light onto a pair of Si lenses and a Ge lens.

Figure 9:
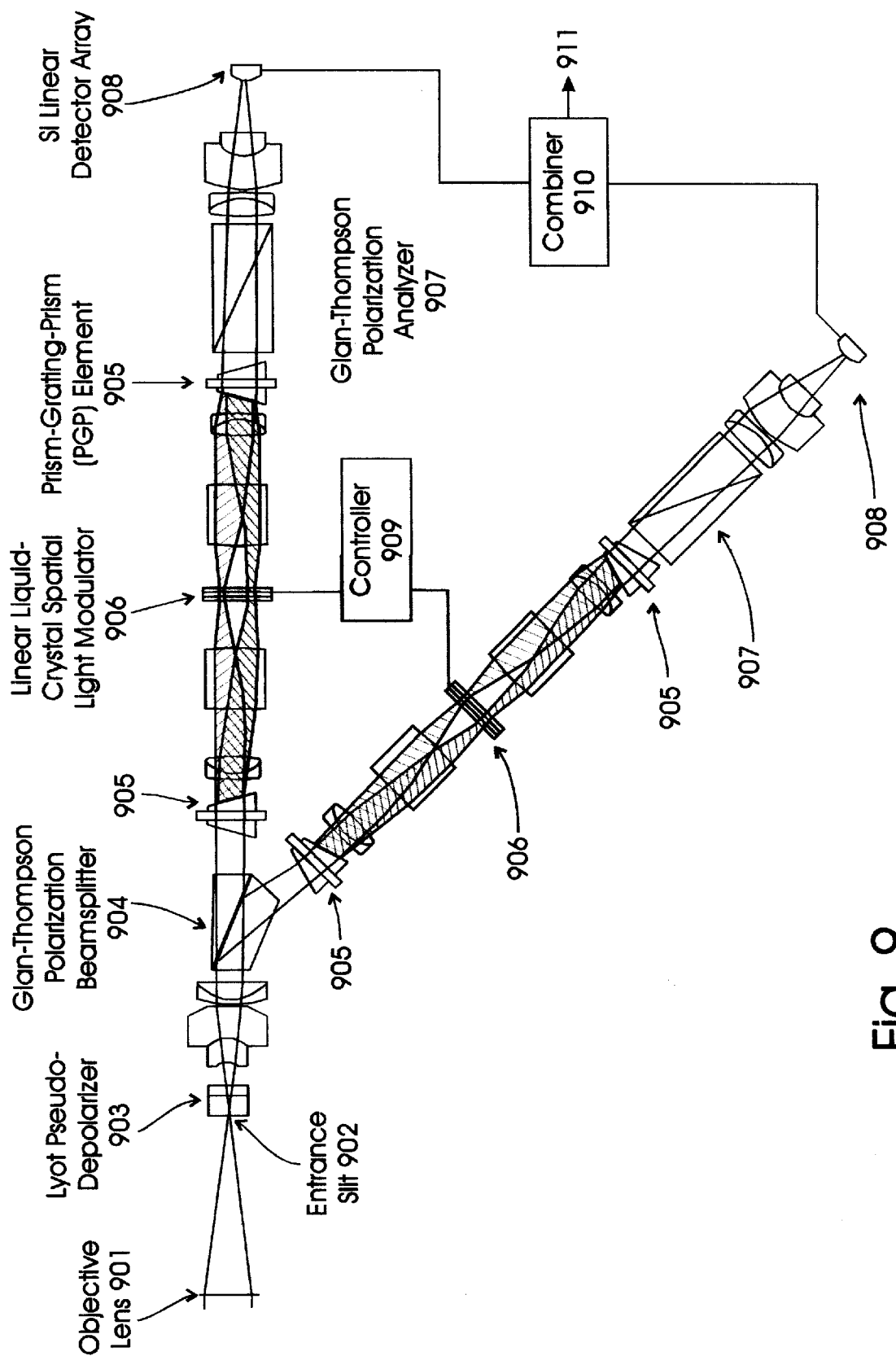
FIG. 9 is a diagram showing the configuration of a working embodiment of the present invention.

One embodiment of the invention, as integrated into a system termed the Information-Efficient Spectral Imaging Sensor (ISIS), is depicted in FIG. 9. The scene is imaged via an objective lens 901 on an entrance slit 902 and passed through a Lyot Pseudo-Depolarizer 903. From there the beam is passed through a Glan-Thompson Polarization Beamsplitter 904 into two identical channels. Each is comprised of a Prism-Grating-Prism Element 905, a Linear Liquid Crystal Spatial Light Modulator 906, another (reversed) Prism-Grating-Prism Element 905, and a Glan-Thompson Polarization Analyzer 907, before impinging on a Silicon Linear Detector Array908. Also shown in this view are a controller 909 to change the attenuation of the liquid crystal SLM's 906 when a different spectral basis vector is needed and a combiner 910 to subtract the output of the "negative" channel of the system from the "positive" channel and provide the output 911 of the system for the particular spectral basis vector set up therein.

For review, an example of a programmable hyperspectral image filter follows. An optical system (e.g., a telescope)

scans a scene and images the scene onto a slit. In a common application, the slit has a width of approximately one pixel and a length considerably longer than this width. The optical spectra from this slit is dispersed perpendicularly to the slit length and then the slit is reimaged forming a two-dimensional image, one axis containing the spatial information in the direction of scanning and the other axis representing the optical spectral information contained in the original slit image. A one-dimensional spatial light modulator (SLM), located in the second (two-dimensional) image plane, has long, thin windows, side-by-side and parallel to the slit (one for each wavelength band). The widths are sized to be the approximate width of a single pixel. The transmission value for each window can be different [$0 \leq t(\Sigma) \leq 1$]. Transmission values are chosen to equal the amplitude of a given optical spectral basis vector. Thus for each pixel in the slit, the sum of the light energy transmitted through all of the windows is equal to the vector dot product of the scene spectrum and the spectral basis vector. Therefore, the part of the optical system behind the SLM accumulates attenuated spectra (for each pixel) together on a single detector. This optical train is moved relative to the scene in a direction perpendicular to the slit length (in the direction of scanning), thus constructing a hyperspectrally filtered, two-dimensional image.

One embodiment is an "optical computer" that sorts the spectra radiated from each pixel of the object field so as to maximize the optical contrast between the material sought (target material) and the materials that constitute the background. For example, this "computer" might be programmed to find plastic (or painted) camouflage material (target) in the jungle (background).

In accordance with a further aspect of the invention, light reflected from, transmitted through or from, or radiated by an object is collected, the light is separated into spectral components, and "selected portions" of the spectral components (defined as a spectral basis vector) are routed to optical detector arrays. These arrays provide two or more optical detectors per pixel in the imaged scene and allow the user to measure directly the spectra to be sorted, attenuated, and summed. (Two or more opticaldetectors per pixel significantly enhance the accuracy of measurement possible.) Thus, for example, in looking for a particular emission representing a desired target, the spectral components are routed by suitable device, such as a telescope. The telescope creates a line image, spectrally displaced by a prism, grating, or combination thereof, and further selected by a Spatial Light Modulator (SLM). This process directs those wavelengths that contain absorption features of the target toward one opticaldetector and adjacent wavelengths toward another optical detector. Taking the difference between the two optical components provides a responsive, high signal-to-noise (S/N) ratio, indicator of the target's emission, transmission, or reflectance. The difference between these two signals can be further maximized by attenuating some of the non-target spectral bands. This programmable hyperspectral optical computer architecture reduces the data rate, the number of detectors, and the storage needed by a factor of about 20 as compared with a standard HIS where the optical data is processed after first translating it into electrical signals and then digitizing the electrical signals. Possible uses of the above embodiments include locating camouflaged equipment or installations in military scenarios based on their reflected spectra (~0.4 $\mu$m$\leq \lambda \leq$~4.0 $\mu$m), the remote assessment of industrial facilities in a non-proliferation setting, location of surface blemishes or spot inclusions in a manufacturing setting, or the assessment of tissue health in a medical setting. Additional uses include soil and vegetation classification, and assessment of forest fire hazard potential based on vegetation stress. A slit imaging system can also be used to image material moving past the system such as on a conveyor belt, railroad track or the like. As such, these spectral vector designs might be useful for discerning between material compositions such as plastics, glass or metal cans when sorting recyclables, or monitoring for quality control. This invention will also be useful in classifying various types of animal and human tissue as to pathology and other criteria.

The final image planes of the systems of the preceding embodiments are spectrally undispersed images of the input slit. This allows the utilization of a detector implementation known as Time-delay and Integrate (TDI). One embodiment is discussed below in reference to FIG. 10. The TDI technique uses the motion of the scene over the detector array to synchronously sum up multiple samples of the same scene point, increasing the signal to noise ratio (SNR) of the measurement. Utilization of focal planes yields a $N^{0.5}$ improvement in SNR, where N is the number of synchronously added steps. This advantage is not possible in any generally utilized hyperspectral imaging configuration.

The TDI technique can be applied to the back end of the systems illustrated in FIGS. 4a, 4b, 8a, 8b and 8c. An implementation of a single channel of FIG. 8a is shown in FIG. 10. The implementations for the other systems are straightforward, given the explanation presented herein. The light is collected by the telescope 10, passed through as slit 34 that is now wider than the previous slit 14 in FIG. 8a, dispersed and converged through optics 36, passed through attenuators 38 for each of the spectral bins, and reconverged by optics 40 onto a TDI array 45 of detectors 41, 42, 43, and 44. As above the stepping and accumulation of signals in the individual detectors is done in synchronization with the motion 32 of the scene across the TDI array and is output as a signal 46. The TDI array 45 with its multiple sensors is then substituted for what was a single detector 808 in FIG. 8a. The use of the TDI array goes hand in hand with the wider slit 34 that allows more light into the system, herein four times more light from a slit four times as wide onto four detector instead of one. This allows the system to utilize Fellgett's advantage to achieve a higher signal to noise ratio at a relatively small increase in electronics. This basic system can be used with any of the above-mentioned systems to replace a single detector with multiple TDI detectors at the back end of the systems. Examples of TDI detector arrays are described in technical catalogs from suppliers such as Dalsa Corporation, Ontario, Canada. TDI methods are disclosed in U.S. Pat. Nos. 5,315,114; 5,231,502 and 4,054,797.

Although the invention has been described above in relation to the preferred embodiments thereof, it will be apparent to those skilled in the art that variations and modifications can be effected in these embodiments without departing from the scope and spirit of the invention.

What is claimed is:

1. A method emphasizing a first aspect of a set of spectral data from an imaged scene with a line-scanning multispectral sensor having m-pixels per row, with n spectral bins sensed per pixel in a row, the method comprising:

utilizing a previously-created first spectral basis vector having n elements to identify the first aspect, some of which elements have negative values and the rest having positive values, said vector being derived from a training set of a multiplicity of n element spectra that includes at least one spectrum of the first aspect and at least one spectrum of the constituents of the background materials in the scene;

to collecting light from the imaged scene and presenting it to the sensor;

attenuating the light in the affected spectral bins of each pixel of a row in a first channel of the sensor based on the value of the respective positive value elements of the first spectral basis vector;

attenuating the light in the affected spectral bins of each pixel of that row in a second channel of the sensor based on the value of the respective negative value elements of the first spectral basis vector;

imaging the modulated light in the first and second channels onto respective first and second linear arrays of detectors, each detector in each array corresponding to a pixel in that row, to provide first and second detector signals; and combining the first and second detector signals to provide an indication of the presence or not of the first aspect in the scanned pixels.

2. The method of claim 1 additionally comprising the step of:

utilizing a previously-created second spectral basis vector having n elements to emphasize a second aspect of the imaged scene, some of which elements have negative values and the rest having positive values, from a training set of a multiplicity of n element spectra to provide an indication of the presence or not of the second aspect in the scanned pixels based on the attenuations to the collected light caused by the second spectral basis vector in parallel with the utilization of the first spectral basis vector.

3. The method of claim 2 additionally comprising the steps of:

splitting the collected light between the first spectral basis vector and the second spectral basis vector;

attenuating the light in the affected spectral basis bins of each pixel of a row in a third channel of the sensor based on the value of the respective positive value elements of the spectral basis vector for the second aspect;

attenuating the light in the affected spectral basis bins of each pixel of the row in a fourth channel of the sensor based on the value of the respective negative value elements of the spectral basis vector for the second aspect;

imaging the modulated light in the third and fourth channels onto respective third and fourth detector arrays to provide third and fourth detector signals; and combining the third and fourth detector signals to provide an indication of the presence or not of the second aspect in the scanned pixels.

4. The method of claim 1 wherein the attenuation of the light in the first and second channels by the first spectral basis vector is responsive to a controller that is responsive to commands from a remote location.

5. The method of claim 1 wherein the light from the scene is presented to the sensor by a slit oriented parallel to the row of pixels.

6. The method of claim 5 wherein the scene is scanned in a direction perpendicular to the long axis of the slit.

7. The method of claim 6 wherein each detector in each array is a time delay and integrate (TDI) detector array that electronically accumulates the signals from its detectors in synchronization with the motion of the scene across such detectors.

8. A line scanning, multispectral sensor having at least two optical channels to emphasize at least one aspect of a scanned scene comprising:

a slit to form a linear image of m pixels in a row;

means to direct the light from the slit for each pixel into first and second channels of light with the light in each channel being dispersed into n spectral bins and to present this light to individual optical attenuators for each spectral bin in each channel, wherein the levels of attenuation, if any, in each attenuator in the first channel correspond to the positive elements in a first spectral basis vector that emphasizes a first aspect of the scanned scene and the levels of attenuation, if any, in each attenuator in the second channel correspond to the negative elements in a spectral basis vector;

detector arrays for each channel with a detector for each spectral bin therein to provide an electrical signal corresponding to the strength of the light leaving the attenuators in each spectral bin in each channel; and means to combine the signals from the two detector arrays to emphasize the first aspect of the scanned scene; wherein the first spectral basis vector is derived from a training set of a multiplicity of n element spectra that includes at least one spectrum of the first aspect and at least one spectrum of the constituents of the background materials in the scene to emphasize the first aspect of the scanned scene.

9. The sensor of claim 8 wherein the means to direct the light into first and second channels with the light in each channel being dispersed into n spectral bins include polarizing beamsplitters and micromirrors, and gratings and prisms, respectively.

10. The sensor of claim 8 further including a controller that adjusts the levels of attenuation in the individual attenuators.

11. The sensor of claim 8 wherein the detectors in the detector arrays comprise time delay and integrate (TDI) arrays that electronically accumulate the signals from its detectors in synchronization with the motion of the scene across such detectors.

12. A line scanning, multispectral sensor having at least two optical channels to emphasize at least one aspect of a scanned scene comprising:

optical elements suitable to image a scene onto a slit;

a slit to form a linear image that is separable into m pixels in a row;

a second optical element suitable to recollimate the light from the slit onto a dispersing element;

a dispersing element to split the light from the slit into n spectral bins that are disposed normal to the axis of the slit;

a third optical element suitable to converge the light from the dispersing element and image the n spectral images of the slit onto n rows of a micromirror array;

a micromirror array comprising a linear array of n individual micromirror assemblies with each assembly corresponding to a single spectral bin such that each assembly is controlled to reflect the light from for its spectral bin into at least two different positions, with a first and second position corresponding to first and second channels, wherein the light in a spectral bin is reflected into the first channel if the corresponding element in a first n element spectral basis vector is positive and the light in that spectral bin is reflected into the second channel if the corresponding element in the first spectral basis vector is negative; p1 a fourth optical element suitable to reimage the light in the first channel from the micromirror array onto a first m-element detector array;

a fifth optical element suitable to reimage the light in the second channel from the micromirror array onto a second m-element detector array; and means to combine the signals from the first and second detector arrays to emphasize the first aspect in each of the pixels of the scanned scene, wherein the first spectral basis vector is derived from a training set of a multiplicity of n element spectra that includes at least one spectrum of the first aspect and at least one spectrum of the constituents of the background materials in the scene to emphasize the first aspect of the scanned scene.

13. The sensor of claim 12 wherein the individual micromirror assemblies include at least two micromirrors in each assembly.

14. The sensor of claim 12 wherein the dispersing element is a grating or a prism.

15. The sensor of claim 12 wherein the detectors in the first and second m-element detector arrays comprise time delay and integrate (TDI) arrays that electronically accumulate the signals from its detectors in synchronization with the motion of the scene across such detectors.

16. A line scanning, multispectral sensor having at least two optical channels to emphasize at least one aspect of a scanned scene comprising:

optical elements suitable to image a scene onto a slit;

a slit to form a linear image that is separable into m pixels in a row;

a second optical element suitable to recollimate the light from the slit onto a first polarizer;

a dispersing element to separate the light into n spectral bins;

a third optical element suitable to recollimate and refocus the light from the dispersing element onto an array of liquid crystal spatial light modulators (SLMs);

an array of SLMs with one SLM for each spectral bin, with each SLM being responsive to signals from a controller with respect to the amount of rotation imparted to the polarization vector of the light passing through that SLM corresponding to the positive and negative elements of a first spectral basis vector;

a fourth optical element suitable to recollimate the light from the array of SLMs onto an analyzing polarizer;

an analyzing polarizer that directs unrotated light from the array of SLMs into a first optical channel and directs rotated light from the array of SLMS into a second optical channel;

a first optical channel that includes a fifth optical element suitable to focus light onto a first detector array;

a second optical channel that includes a sixth optical element suitable to focus light onto a second detector array; and means to combine the signals from the first and second detector arrays in order to emphasize a first aspect in the pixels of the scanned scene, wherein the first spectral basis vector is derived from a training set of a multiplicity of n element spectra that includes at least one spectrum of the first aspect and at least one spectrum of the constituents of the background materials in the scene to emphasize the first aspect of the scanned scene.

17. The sensor of claim 16 wherein the dispersing element is a grating or a prism.

18. The sensor of claim 16 wherein the detectors in the first and second detector arrays comprise time delay and integrate (TDI) arrays that electronically accumulate the signals from its detectors in synchronization with the motion of the scene across such detectors.

* * * * *